(12) United States Patent
Chiang et al.

(10) Patent No.: US 8,217,329 B2
(45) Date of Patent: Jul. 10, 2012

(54) MICROMINIATURIZED PROJECTION MODULE HAVING AN IMAGE PROCESSING UNIT FOR TRANSFORMING EACH OF IMAGE SIGNALS INTO A MODULATING SIGNAL AND A DIRECTION SIGNAL FOR PROJECTING IMAGE ONTO OBJECT

(75) Inventors: Chung-I Chiang, Taoyuan (TW); Hung-Yi Lin, Taoyuan (TW); Hsien-Lung Ho, Taoyuan (TW)

(73) Assignee: Walsin Lihwa Corporation, Taoyuan (TW)

( * ) Notice: Subject to any disclaimer, the term of this patent is extended or adjusted under 35 U.S.C. 154(b) by 424 days.

(21) Appl. No.: 12/652,801

(22) Filed: Jan. 6, 2010

(65) Prior Publication Data

US 2011/0164223 A1   Jul. 7, 2011

(51) Int. Cl.
*H01L 27/00* (2006.01)
(52) U.S. Cl. ................................ 250/208.1; 353/39
(58) Field of Classification Search ............... 250/208.1, 250/205, 214 R, 216; 353/39, 30–34; 345/690; 348/744, 745, 806
See application file for complete search history.

(56) References Cited

U.S. PATENT DOCUMENTS 6,558,006 B2 *   5/2003   Ioka ............................... 353/94

* cited by examiner

*Primary Examiner* — Que T Le
(74) *Attorney, Agent, or Firm* — Bacon & Thomas, PLLC

(57) ABSTRACT

A microminiaturized projection module for projecting an image onto an object is disclosed in the present invention. The module includes a number of light units each for providing red, green, and blue beams; an image processing unit for receiving the image, dividing the image into n×m image signals, and transforming each of the image signals into a modulating signal and a direction signal, where n and m are integrals not less than 2, respectively; a number of modulation units for modulating the beams from one light unit according to the modulating signal received from the image processing unit and sending out the modulated beams simultaneously; and an array of n×m mirrors for projecting the modulated beams to form the image onto the object according to the direction signal received from the image processing unit. The invention has advantages that can reduce modulation speed, undergo slight shock and be free from raster pinch effect.

21 Claims, 13 Drawing Sheets

MICROMINIATURIZED PROJECTION MODULE HAVING AN IMAGE PROCESSING UNIT FOR TRANSFORMING EACH OF IMAGE SIGNALS INTO A MODULATING SIGNAL AND A DIRECTION SIGNAL FOR PROJECTING IMAGE ONTO OBJECT

FIELD OF THE INVENTION

The present invention relates generally to a microminiaturized projection module. More specifically, the present invention relates to a microminiaturized projection module for projecting an image onto any object with an array of mirrors.

BACKGROUND OF THE INVENTION

Projectors used in daily life are manufactured based on 3LCD, Digital Light Processing (DLP) or Liquid Crystal on Silicon (LCoS) technology. Although the color models and projection principles are different from each other, these technologies separate white light beams from high voltage halogen lamps or mercury vapor lamps into red (R), green (G) and blue (B) beams by dichronic mirrors, panels or color wheels. However, as to requirement of portability for every device people use in daily life, bulky size of the projectors manufactured by the projection methods with traditional lamps can not be further reduced. Therefore, it is inevitable to use light emitting diode (LED) or visible laser diode (LD) to replace the traditional lamps as a solution for miniaturized projectors.

Recently, projector manufacturers start to use three-primary-color (RGB) LED or visible LD. LED or visible LD has small volume. By using DLP and LCoS technologies with these light sources, lighting devices can be effectively simplified so that the projector can be more compact. Meanwhile, LED or visible LD has more advantages that traditional lamps don't have. For example, LED or visible LD can be switched on swiftly, operate noiselessly and have longer lifetime so that user doesn't have to change LED or visible LD often.

A visible laser is a laser with a beam that can be seen by the naked eye. Through a process known as stimulated emission, laser releases light beams, or electromagnetic radiation. Essentially, an electron is stimulated and moves to an area of lower energy. The energy lost takes the form of a photon, a unit of electromagnetic radiation, and is emitted in the form of a laser beam. Laser light is usually spatially coherent, which means that the light either is emitted in a narrow, low-divergence beam, or can be converted into one with the help of optical components such as lenses. Hence, compared with LED, a visible laser diode can emit beams for a longer transmission distance. Images sent via laser beams are not interfered with a multi-directional light source. Therefore, mini projectors (or called pico projectors) often use visible laser diodes as a light source.

Several inventions disclose designs of a projecting system using laser diodes as a light source. Please refer to FIG. 1. U.S. Pat. No. 7,252,394 provides a projection display system which includes a light source emitting a light beam, and a reflecting mirror system for scanning the light beam over an image to illuminate the image. The light source can be a solid state device such as a laser diode. The reflecting mirror system can be one or more MEMS scanning mirrors that rotate to raster scan the light beam over the image. The image can be an advertisement located on a wall, a screen, a sign, or a billboard. The image can also be a semi-transparent image that is projected onto a medium to produce a larger image. The reflecting mirror system has one vertically scanning mirror and at least one horizontally scanning mirror. Hence, a raster scanning over one complete screen or more discrete tiles can be achieved. However, although only one vertically scanning mirror is able to perform raster scanning, it is hard to coordinate other horizontally scanning mirrors with the vertically scanning mirror. For a screen composed of several tiles, there would be many malpositions or even tile overlapping occurred due to the problem. When the device is slightly shocked, the whole screen will become unstable as well.

FIG. 2 shows U.S. Pat. No. 7,209,271. '271 provides a display apparatus which includes a scanning assembly that scans about two or more axes, typically in a raster pattern. A number of light sources emit light from spaced apart locations toward the scanning assembly so that the scanning assembly simultaneously scans more than one of the beams. The light sources are positioned so that their beams each illuminate discrete regions of the image field that are substantially non-overlapping with respect to the other discrete regions. The image is thus formed from a set of tiles. By activating a first light source during a forward sweep of the mirror and activating a second light source during a reverse sweep of the mirror, a common line can be written during a single sweep of the mirror. Shifting the position of the sources such that the two halves are aligned reduces raster pinch. The invention points out the problem of raster pinch effect and provides a solution to it. However, the modulator for controlling color model has heavy work load. The device can not work properly under slight shock.

The objects of the present invention are to solve the problems mentioned above. Meanwhile, it has effect to reduce modulation speed. Each modulator can have a longer life time and be easily repaired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a microminiaturized projection module for projecting an image onto an object, comprising: a plurality of light units each for providing red, green, and blue beams; an image processing unit for receiving the image, dividing the image into n×m image signals, and transforming each of the image signals into a modulating signal and a direction signal, where n and m are integrals not less than 2, respectively; a plurality of modulation units for modulating the beams from one light unit according to the modulating signal received from the image processing unit and sending out the modulated beams simultaneously; and an array of n×m mirrors for projecting the modulated beams to form the image onto the object according to the direction signal received from the image processing unit; wherein the modulation units have an amount not less than n×m, and the light units have an amount same as that of the modulation units.

Preferably, the modulation units send the modulated beams to the mirrors one to one when the modulation units are n×m.

Preferably, at least one mirror receives the modulated beams from at least two modulation units when the modulation units are more than n×m.

Preferably, the mirror is a 2-axis torsion mirror.

Preferably, the mirror, having a horizontal-axle and a vertical-axle, can rotate horizontally relative to the vertical-axle and vertically relative to the horizontal-axle, and has mechanical rotation angles up to ±10°, respectively.

Preferably, the mirror comprises two single-axle torsion mirrors.

Preferably, one of the two single-axle torsion mirrors scans faster than the other.

Preferably, the two single-axle torsion mirrors each has an axle perpendicular to each other.

Preferably, the mirror is driven by electromagnetic forces, electrostatic forces, piezoelectric forces or the combination thereof.

Preferably, the mirror is made of semiconductor, metal or polymer.

Preferably, the mirror is made by micro-electro-mechanical system (MEMS) technology.

Preferably, the image is scanned via raster scanning or Lissajous scanning.

Preferably, the light units comprise visible laser diodes.

Preferably, the light unit emits green light by diode pumped solid-state (DPSS) technology.

Preferably, the modulation units comprise acoustic-optic modulators, magneto-optic modulators, or electro-optic modulators for independently modulating the red, green and blue beams generated by the light units.

Preferably, the mirror rotates horizontally and vertically according to the direction signal to project the modulated beams onto the object.

Preferably, the object is a wall, a screen, a table surface or a billboard.

Preferably, the object has planar, curved or rough surface.

Preferably, the object is divided into n columns and in rows and each of the mirrors scans on a specified region formed by intersection of a column and a row.

Preferably, the columns have the same width.

Preferably, the rows have the same length.

DETAILED DESCRIPTION OF THE PREFERRED EMBODIMENTS

For better understanding of the present invention, three embodiments are described below.

First Embodiment

Figure 1:
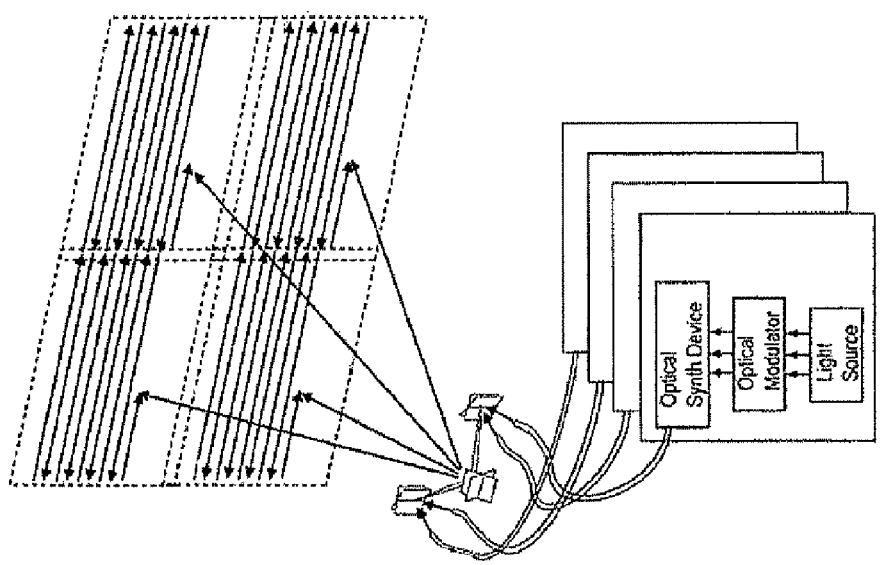
FIG. 1 illustrates a prior art.
Figure 2:
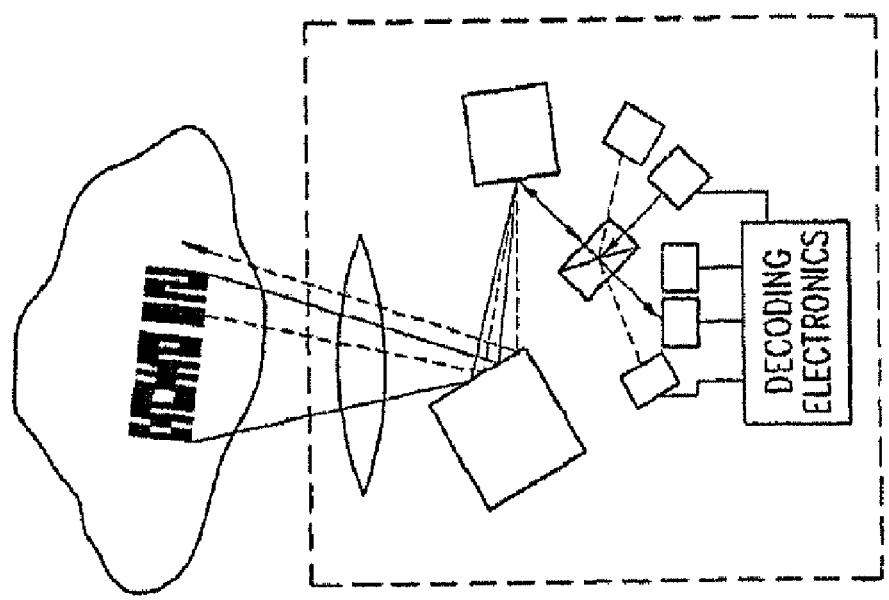
FIG. 2 illustrates another prior art.
Figure 3:
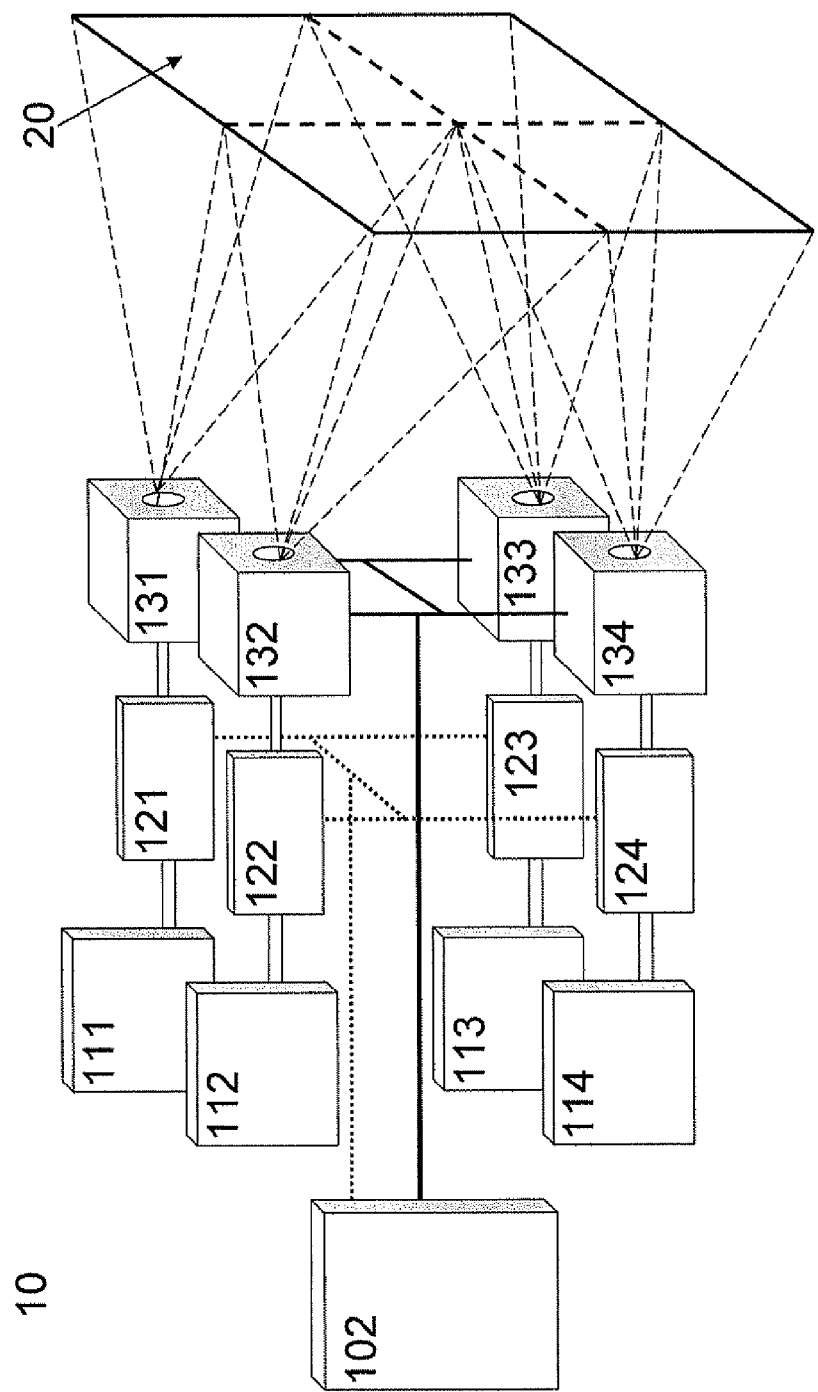
FIG. 3 shows a first embodiment of the present invention.

Please refer to FIG. 3 to FIG. 6. A first embodiment is illustrated. FIG. 3 shows a microminiaturized projection module 10 and a planar screen 20 for forming an image. The microminiaturized projection module 10 has an image processing unit 102 for receiving the image, dividing the image into four (2×2) image signals, and transforming each of the image signals into a modulating signal and a direction signal. The microminiaturized projection module 10 also has a first light unit 111, a second light unit 112, a third light unit 113 and a fourth light unit 114. Each light unit provides red, green, and blue beams. A first modulation unit 121, a second modulation unit 122, a third modulation unit 123 and a fourth modulation unit 124 are connected with the first light unit 111, the second light unit 112, the third light unit 113 and the fourth light unit 114 respectively. Each modulation unit modulates the beams from the corresponding light unit according to the modulating signal received from the image processing unit 102 and sends out the modulated beams simultaneously. The modulation units comprise acoustic-optic modulators for independently modulating the red, green and blue beams generated by the light units.

The microminiaturized projection module 10 further has a first mirror 131, a second mirror 132, a third mirror 133 and a fourth mirror 134. The four mirrors form a 2×2 array. The mirrors are made of semiconductor and can be driven electromagnetically, electrostatically, or piezoelectrically.

The first mirror 131, the second mirror 132, the third mirror 133 and the fourth mirror 134 project the modulated beams from the first modulation unit 121, the second modulation unit 122, the third modulation unit 123 and the fourth modulation unit 124 respectively and form the image onto the screen 20 according to the corresponding direction signal received from the image processing unit 102. It is obvious that the corresponding relation between modulation units and mirrors is one to one.

Figure 4:
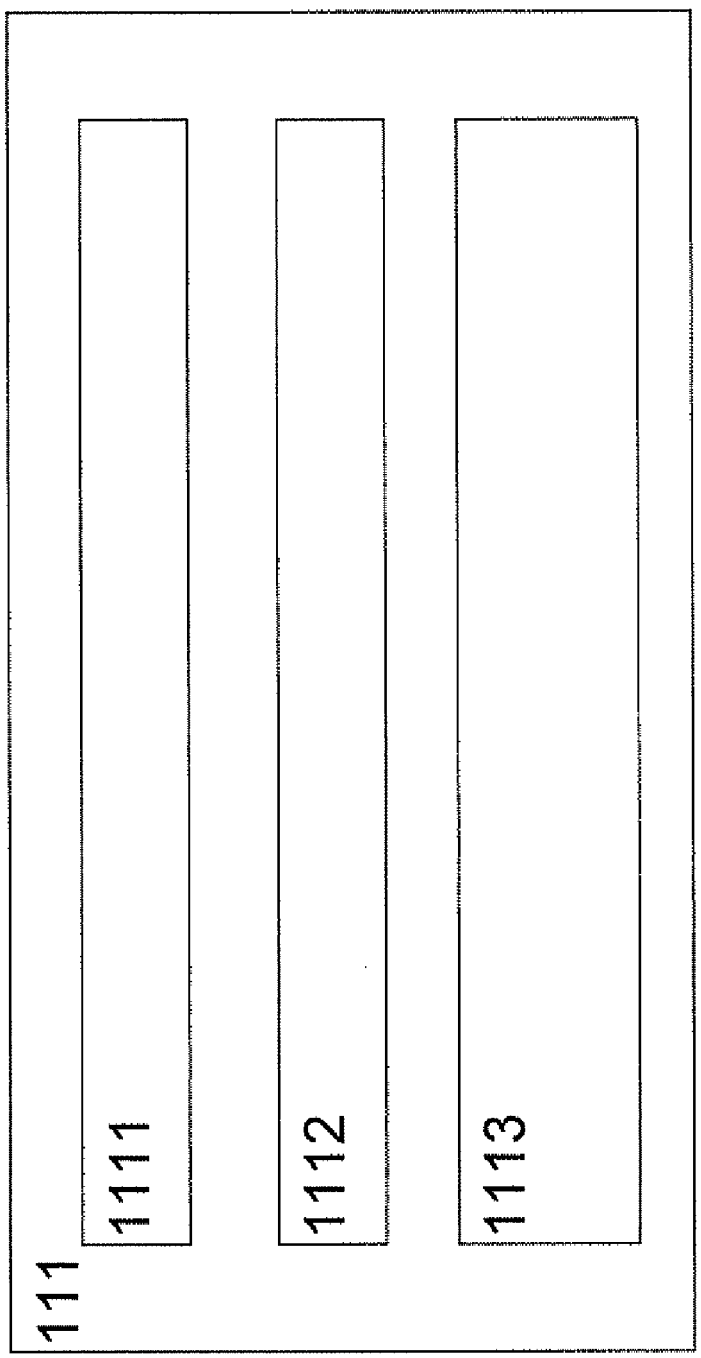
FIG. 4 shows a block diagram of a light unit in the first embodiment.

Please refer to FIG. 4. It shows a block diagram of the first light unit 111. The first light unit 111 comprises a red visible laser diode 1111, a blue visible laser diode 1112, and a green visible laser emitter 1113. It should be stressed that a natural green visible laser has not been invented. Therefore, the green visible laser emitter 1113 uses pumped solid-state (DPSS) technology. The second light unit 112, the third light unit 113 and the fourth light unit 114 have the same internal structure. No further diagram is needed for illustrating purpose.

Figure 5:
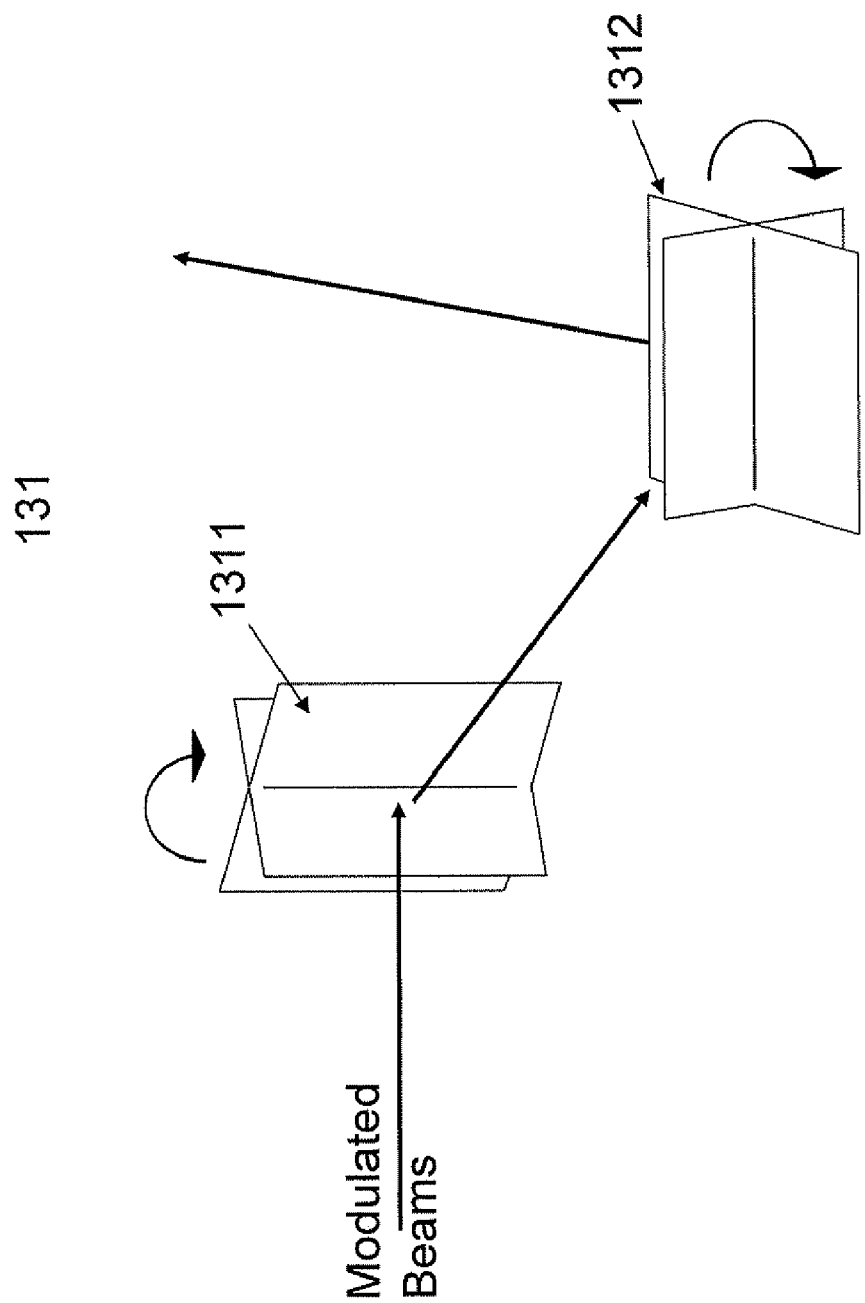
FIG. 5 shows a mirror structure in the first embodiment.

Next, FIG. 5 shows how the mirrors work to reflect the beams received from the modulation units. Take the first mirror 131 for example. The first mirror 131 comprises two single-axle torsion mirrors, i.e., a vertical-axle torsion minor 1311 and a horizontal-axle torsion mirror 1312. The vertical-axle torsion mirror 1311 can rotate around a vertical axle and the horizontal-axle torsion mirror 1312 can rotate around a horizontal axle. Both have mechanical rotation angles up to ±10°. The vertical axle is perpendicular to the horizontal axle. When a modulated beam comes to the first mirror 131, the first mirror 131 adjusts angles of the vertical-axle torsion mirror 1311 and the horizontal-axle torsion mirror 1312 according to the direction signal from the image processing unit 102. Therefore, the modulated beam will be reflected vertically then horizontally. Finally, it is projected onto a specified location on the screen 20.

Figure 6:
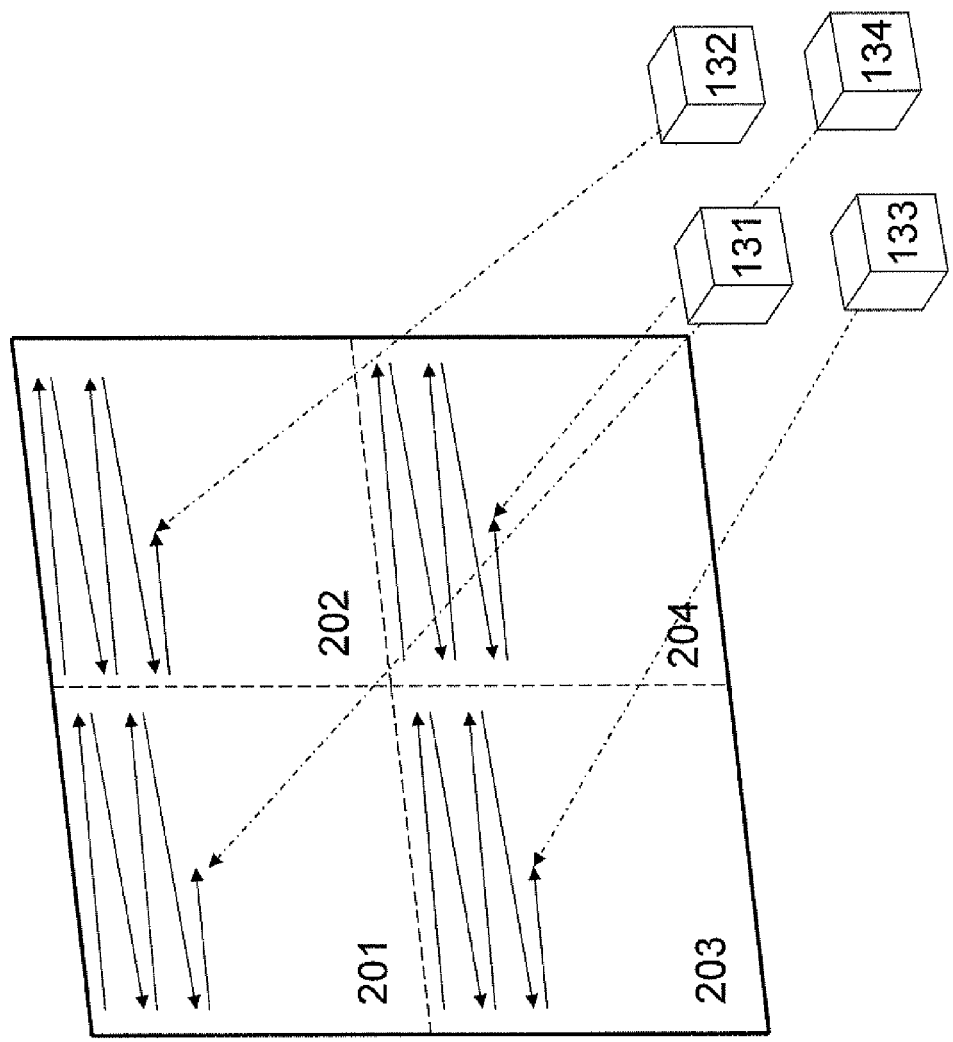
FIG. 6 shows how an image is projected in the first embodiment.

Please see FIG. 6. It shows how the image is projected onto the screen 20. The first mirror 131, the second mirror 132, the third mirror 133 and the fourth mirror 134 are used to scan one-fourth of the image. When the image is projected, the screen 20 can be divided into four tiles with 2 columns and 2 rows accordingly. They are a first tile 201, a second tile 202, a third tile 203 and a fourth tile 204. The columns have the same width and so do the rows. Hence, every tile has the same area. There is no overlap of any two tiles. FIG. 6 also shows the scanning process. In the present invention, the image is scanned via raster scanning. Therefore, the vertical-axle torsion mirror 1311 rotates slower than the horizontal-axle torsion mirror 1312 because raster scanning needs faster horizontal scanning. In practice, scanning process is not limited to raster scanning. Sometimes, Lissajous scanning is used for a solid image.

Since there are four independent modulation units, modulation speed of each one can be reduced. If one of the modulation units doesn't work well, it is easy to repair the module by replacing the bad one. Meanwhile, the present invention can undergo slight shock without damaging the whole image.

Second Embodiment

Figure 7:
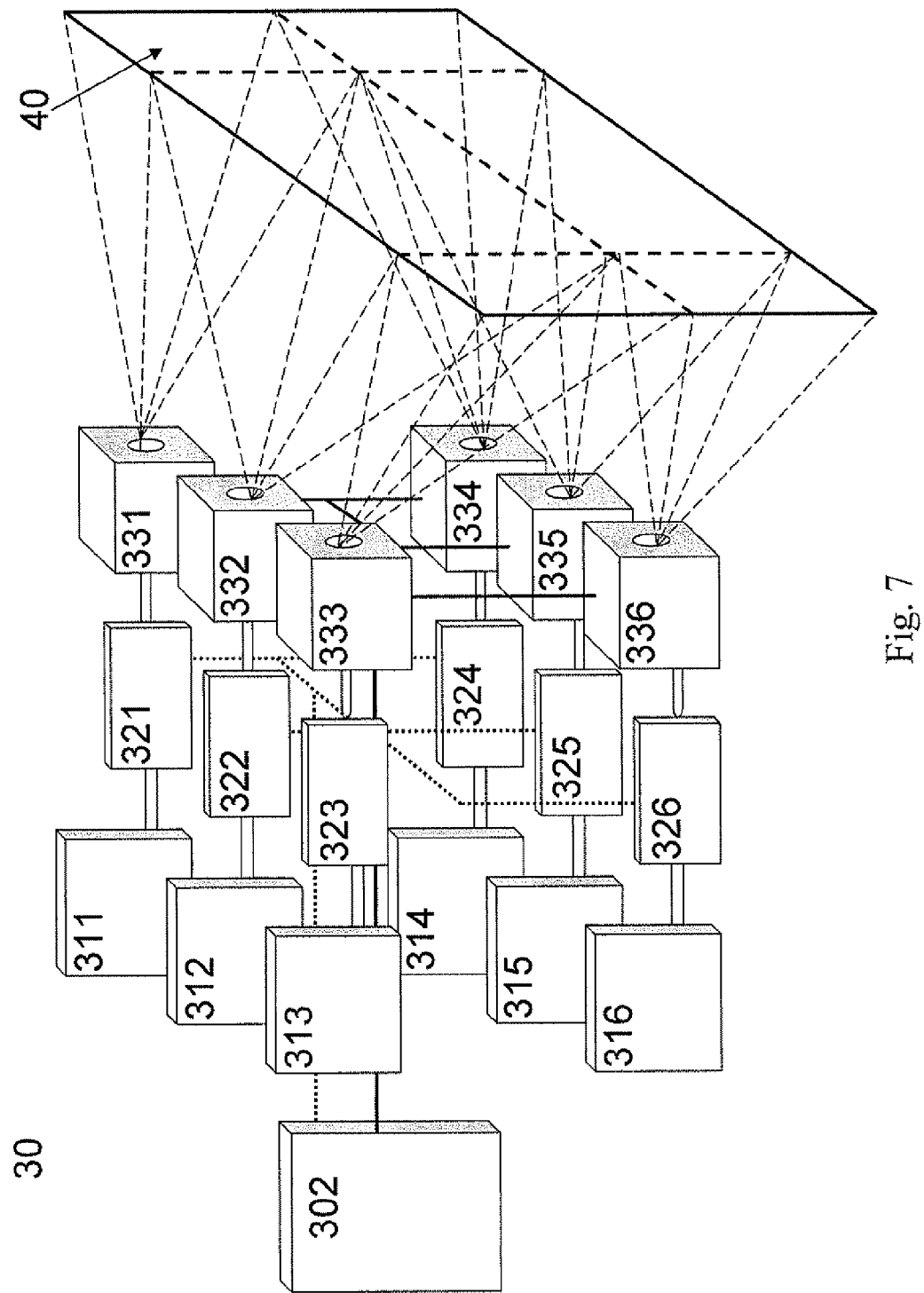
FIG. 7 shows a second embodiment of the present invention.

Please refer to FIG. 7 to FIG. 10. A second embodiment is illustrated. FIG. 7 shows a microminiaturized projection module 30 and a rough billboard 40 for forming an image. The microminiaturized projection module 30 has an image processing unit 302 for receiving the image, dividing the image into six (3×2) image signals, and transforming each of the image signals into a modulating signal and a direction signal. The microminiaturized projection module 30 also has a first light unit 311, a second light unit 312, a third light unit 313, a fourth light unit 314, a fifth light unit 315 and a sixth light unit 316. Each light unit provides red, green, and blue beams. A first modulation unit 321, a second modulation unit 322, a third modulation unit 323, a fourth modulation unit 324, a fifth modulation unit 325 and a sixth modulation unit 326 are connected with the first light unit 311, the second light unit 312, the third light unit 313, the fourth light unit 314, the fifth light unit 315 and the sixth light unit 316 respectively. Each modulation unit modulates the beams from the corresponding light unit according to the modulating signal received from the image processing unit 302 and sends out the modulated beams simultaneously. The modulation units comprise magneto-optic modulators for independently modulating the red, green and blue beams generated by the light units.

The microminiaturized projection module 30 further has a first mirror 331, a second mirror 332, a third mirror 333, a fourth mirror 334, a fifth mirror 335 and a sixth mirror 336. The six mirrors form a 3×2 array. The mirrors are made of steel and driven electromagnetically.

The first mirror 331, the second mirror 332, the third mirror 333, the fourth mirror 334, the fifth mirror 335 and the sixth mirror 336 project the modulated beams from the first modulation unit 321, the second modulation unit 322, the third modulation unit 323, the fourth modulation unit 324, the fifth modulation unit 325 and the sixth modulation unit 326 respectively and form the image onto the billboard 40 according to the corresponding direction signal received from the image processing unit 302. It is obvious that the corresponding relation between modulation units and mirrors is one to one like the first embodiment. The mirrors are made by micro-electro-mechanical system (MEMS) technology.

Figure 8:
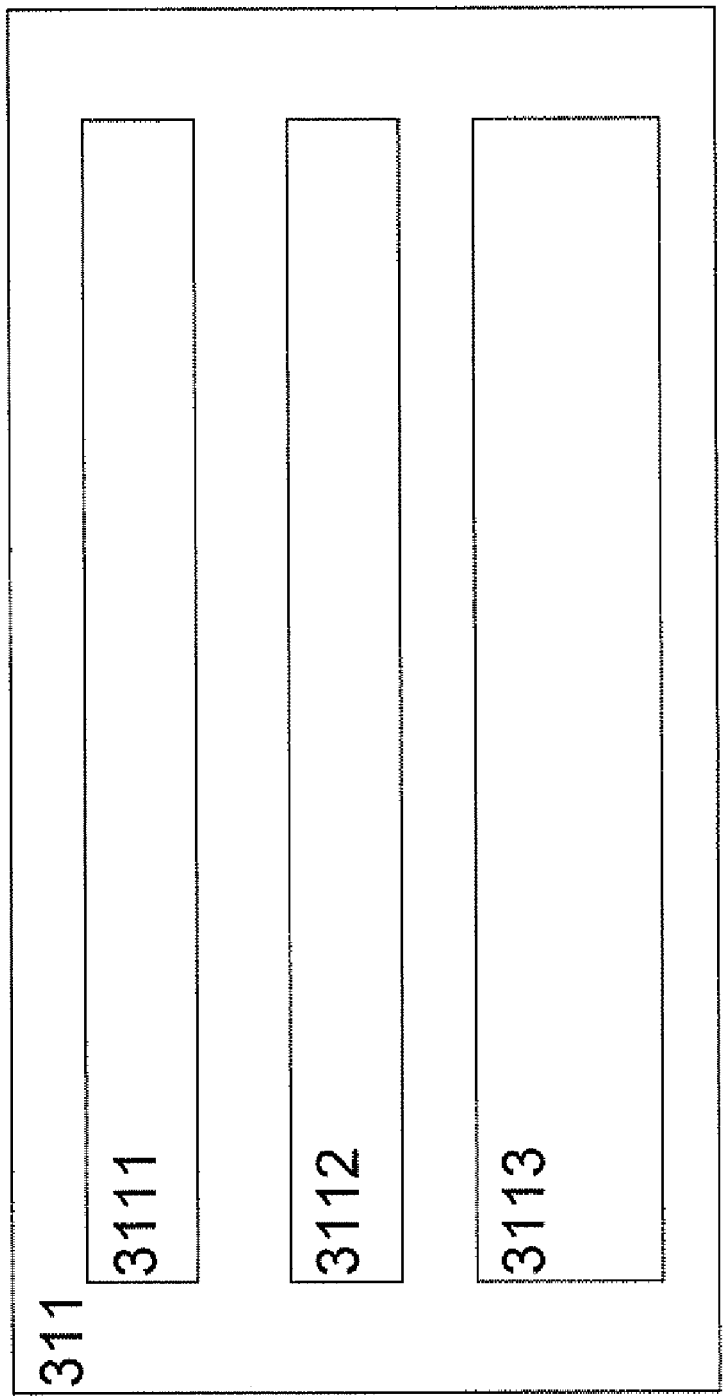
FIG. 8 shows a block diagram of a light unit in the second embodiment.

Please refer to FIG. 8. It shows a block diagram of the first light unit 311. The first light unit 311 comprises a red light emitting diode 3111, a blue light emitting diode 3112, and a green light emitting diode 3113. The second light unit 312, the third light unit 313, the fourth light unit 314, the fifth light unit 315 and the sixth light unit 316 have the same internal structure. No further diagram is needed for illustrating purpose.

Figure 9:
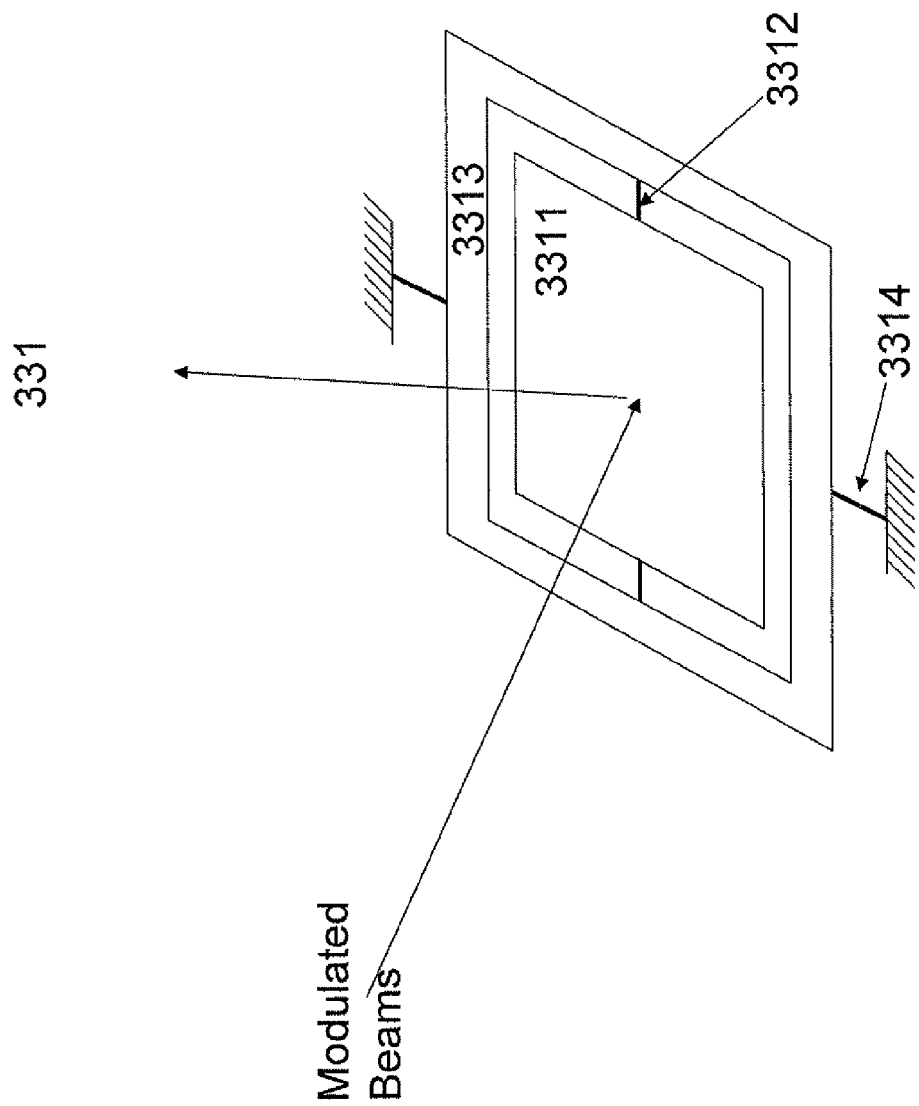
FIG. 9 shows a mirror structure in the second embodiment.

Next, FIG. 9 shows how the mirrors work to reflect the beams received from the modulation units. Take the first mirror 331 for example. The first mirror 131 is a 2-axis torsion mirror. It has a horizontally rotating element 3311, a horizontal-axle 3312, a vertically rotating element 3313 and a vertical-axle 3314 so that the first mirror 331 can rotates horizontally relative to the vertical-axle and vertically relative to the horizontal-axle. The first mirror 331 has mechanical rotation angles in both vertical and horizontal direction up to ±10°. When a modulated beam comes to the first mirror 331, the first mirror 331 adjusts angles by rotating around the horizontal-axle 3312 and the vertical-axle 3314 according to the direction signal from the image processing unit 302. Therefore, the modulated beam will be reflected. Finally, it is projected onto a specified location on the billboard 40.

Figure 10:
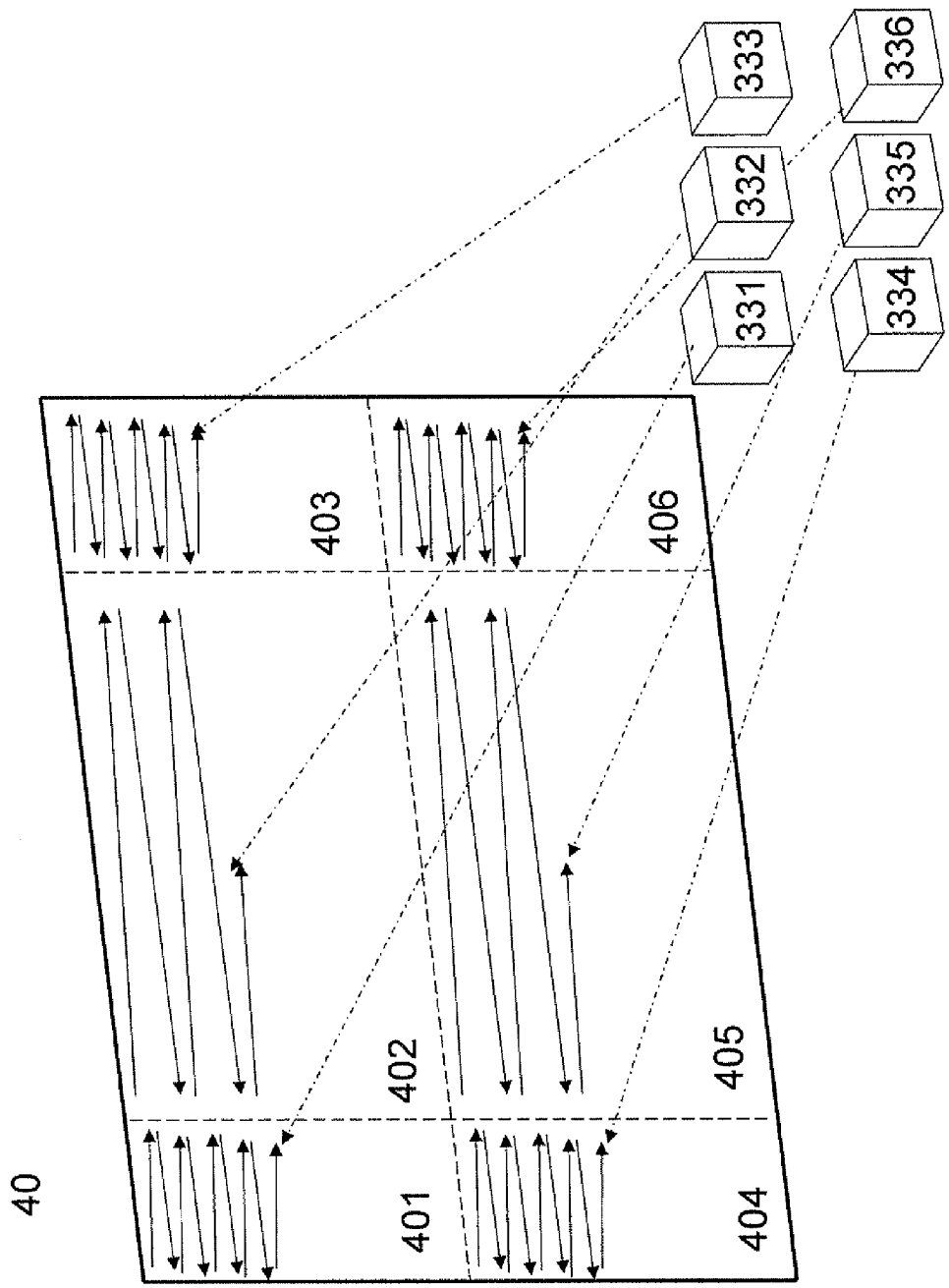
FIG. 10 shows how an image is projected in the second embodiment.

Please see FIG. 10. It shows how the image is projected onto the billboard 40. The first mirror 331, the second mirror 332, the third mirror 333, the fourth mirror 334, the fifth mirror 335 and the sixth mirror 336 are used to scan one part of the image. When the image is projected, the billboard 40 can be divided into six tiles with 3 columns and 2 rows accordingly. Obviously, every tile doesn't have the same area. They are a first tile 401, a second tile 402, a third tile 403, a fourth tile 404, a fifth tile 405 and a sixth tile 406. There is no overlap of any two tiles. FIG. 10 also shows that the second embodiment has the same scanning process as that of the first embodiment. In the present invention, the image is scanned via raster scanning. The combined motion of the two scanning directions form a sinusoidal raster in the vertical direction and cause non-uniform line spacing for the case of bidirectional scanning as if the forward and backward half-period raster lines are pinched near the edge of the display screen. Raster pinch effect degrades the image quality, especially for multi-beam scanning systems. In the present invention, in order to reduce the raster pinch effect, the first tile 401, the third tile 403, the fourth tile 404, and a sixth tile 406 located on the edge of the image have double scanning frequency and half brightness as those of the second tile 402 and the fifth tile 405. Raster pinch effect can be reduced thereby.

Third Embodiment

Figure 11:
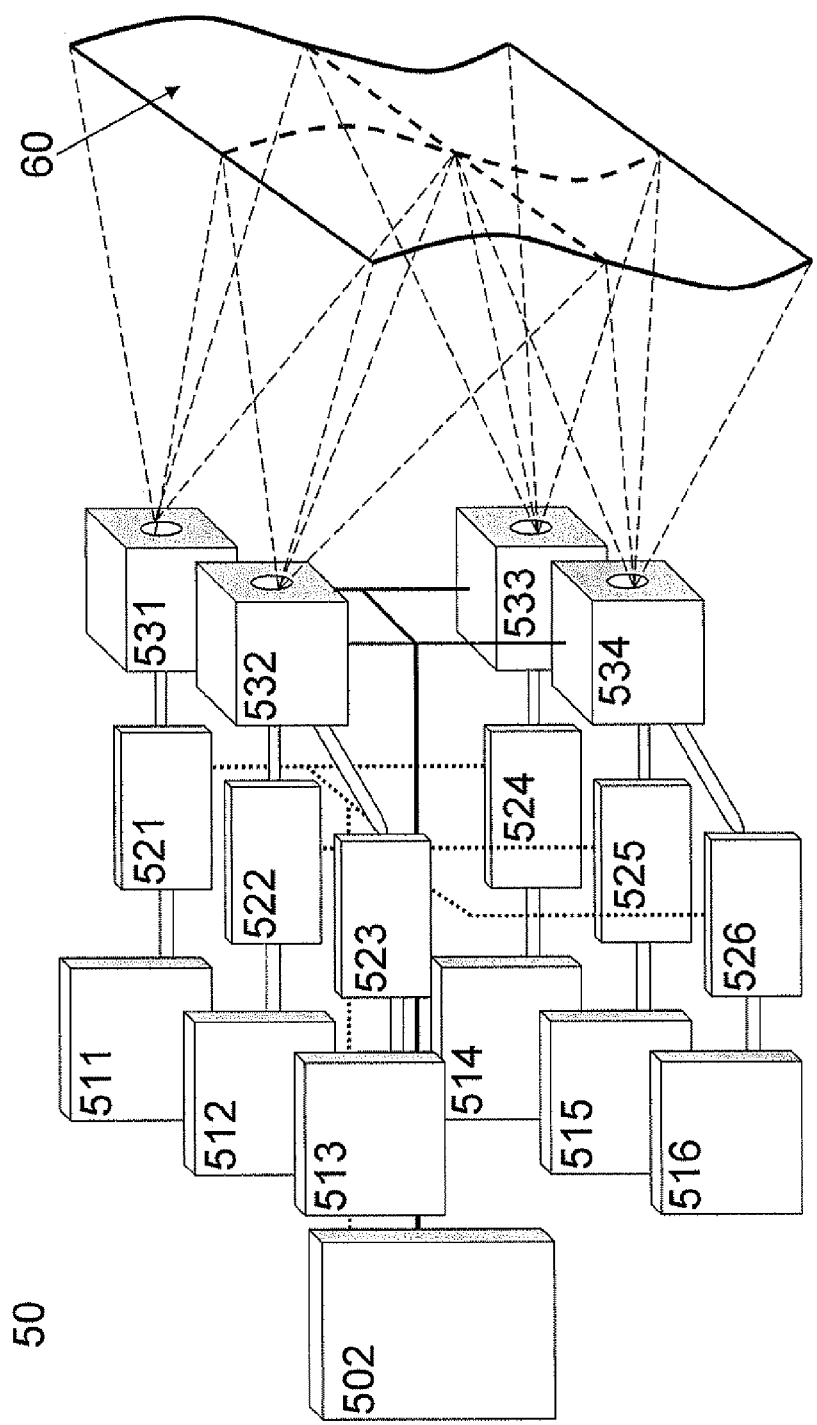
FIG. 11 shows a third embodiment of the present invention.
Figure 12:
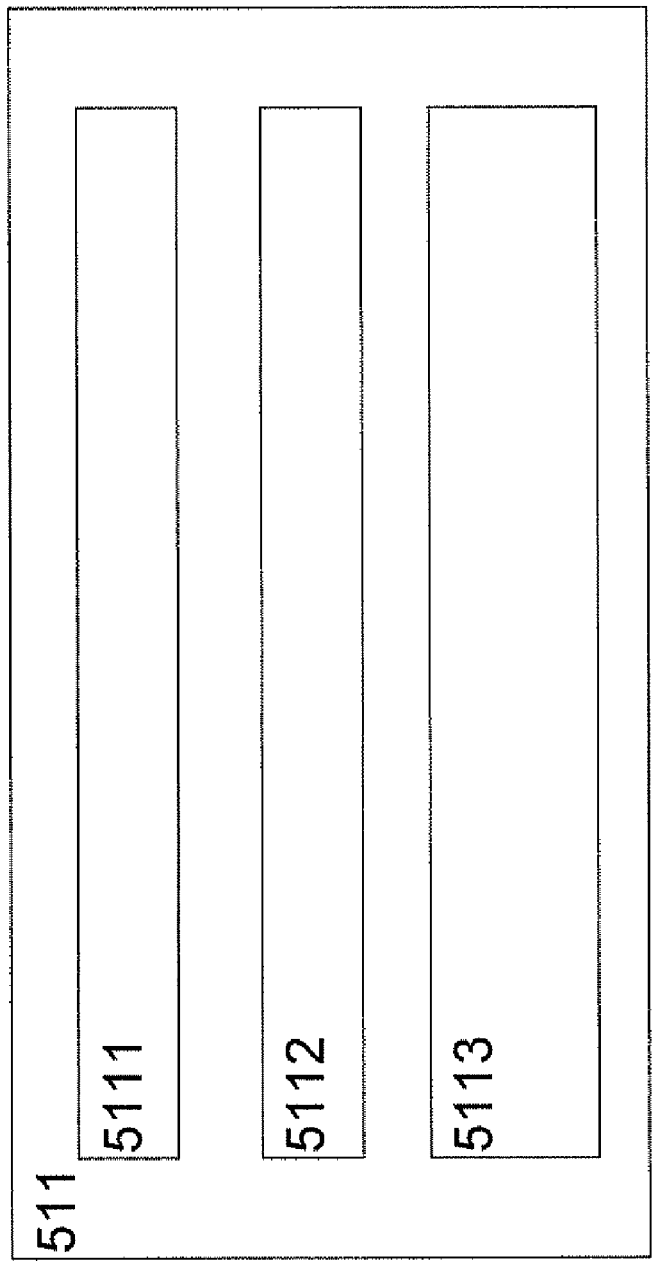
FIG. 12 shows a block diagram of a light unit in the third embodiment.
Figure 13:
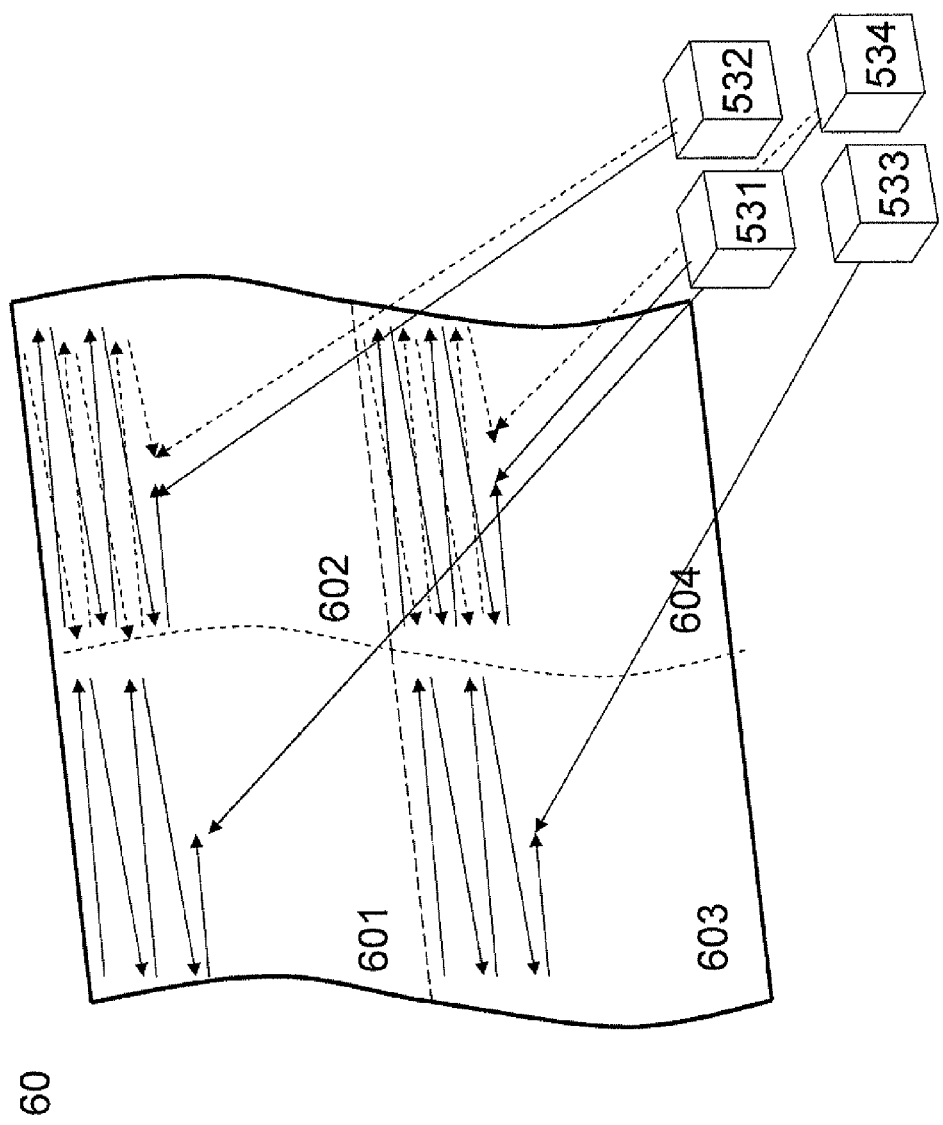
FIG. 13 shows how an image is projected in the third embodiment.

Please refer to FIG. 11 to FIG. 13. A third embodiment is illustrated, FIG. 11 shows a microminiaturized projection module 50 and a curved surface 60 for showing an image. The microminiaturized projection module 50 has an image processing unit 502 for receiving the image, dividing the image into four (2×2) image signals, and transforming each of the image signals into a modulating signal and a direction signal. The microminiaturized projection module 50 also has a first light unit 511, a second light unit 512, a third light unit 513, a fourth light unit 514, a fifth light unit 515 and a sixth light unit 516. Each light unit provides red, green, and blue beams. A first modulation unit 521, a second modulation unit 522, a third modulation unit 523, a fourth modulation unit 524, a fifth modulation unit 525 and a sixth modulation unit 526 are connected with the first light unit 511, the second light unit 512, the third light unit 513, the fourth light unit 514, the fifth light unit 515 and the sixth light unit 516 respectively. Each modulation unit modulates the beams from the corresponding light unit according to the modulating signal received from the image processing unit 502 and sends out the modulated beams simultaneously. The modulation units comprise electro-optic modulators for independently modulating the red, green and blue beams generated by the light units.

The microminiaturized projection module 50 further has a first mirror 531, a second mirror 532, a third mirror 533 and a fourth mirror 534. The four mirrors form a 2×2 array. The mirrors are made of polymer and driven electromagnetically. In practice, it is not limited to electromagnetical forces. The mirrors can be driven by electromagnetic forces, electrostatic forces, or the combination thereof.

The first mirror 531 and the third mirror 533 project the modulated beams from the first modulation unit 521 and the fourth modulation unit 524, respectively. However, the second mirror 532 projects the modulated beams from the second modulation unit 522 and the third modulation unit 523 at the same time. The fourth mirror 534 projects the modulated beams from the fifth modulation unit 525 and the six modulation unit 526 simultaneously.

The beams projected by the mirrors form the image onto the surface 60 according to the corresponding direction signal received from the image processing unit 502. It is obvious that the corresponding relation between modulation units and mirrors is not one to one. One mirror can project beams from more than one modulation unit.

Please refer to FIG. 12. It shows a block diagram of the first light unit 511. The first light unit 511 comprises a red visible laser diode 5111, a blue visible laser diode 5112, and a green visible laser emitter 5113. The second light unit 512, the third light unit 513, the fourth light unit 514, the fifth light unit 515 and the sixth light unit 516 have the same internal structure. No further diagram is needed for illustrating purpose. Meanwhile, the mirrors have the same structure as that in the second embodiment. Description of the mirrors is omitted.

Please see FIG. 13. It shows how the image is projected onto the surface 60. The first mirror 531, the second mirror 532, the third mirror 533 and the fourth mirror 534 are used to scan one part of the image. When the image is projected, the surface 60 can be divided into four tiles with 2 columns and 2 rows accordingly. Obviously, every tile has the same area. They are a first tile 601, a second tile 602, a third tile 603 and a fourth tile 604. Although the tile has curved surface, there is no overlap of any two tiles. The key feature of the third embodiment is that one tile is scanned by two modulation units. The second tile 602 receives modulated beams from the second mirror 532 and is scanned by the second modulation unit 522 and the third modulation unit 523. The fourth tile 604 receives modulated beams from the fourth mirror 534 and is scanned by the fifth modulation unit 525 and the six modulation unit 526. The beams from the second modulation unit 522 and the third modulation unit 523 scan in different directions and so do the beams from the fifth modulation unit 525 and the six modulation unit 526. Raster pinch effect on the second tile 602 and the fourth tile 604 can be diminished. Of course, the same means can be applied on the first tile 601 and the third tile 603. It depends on requirement of the image.

While the invention has been described in terms of what is presently considered to be the most practical and preferred embodiments, it is understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A microminiaturized projection module for projecting an image onto an object, comprising:
   a plurality of light units each for providing red, green, and blue beams;
   an image processing unit for receiving the image, dividing the image into n×m image signals, and transforming each of the image signals into a modulating signal and a direction signal, where n and m are integrals not less than 2, respectively;
   a plurality of modulation units for modulating the beams from one light unit according to the modulating signal received from the image processing unit and sending out the modulated beams simultaneously; and
   an array of n×m mirrors for projecting the modulated beams to form the image onto the object according to the direction signal received from the image processing unit;
   wherein the modulation units have an amount not less than n×m, and the light units have an amount same as that of the modulation units.

2. The microminiaturized projection module according to claim 1, wherein the modulation units send the modulated beams to the mirrors one to one when the modulation units are n×m.

3. The microminiaturized projection module according to claim 1, wherein at least one mirror receives the modulated beams from at least two modulation units when the modulation units are more than n×m.

4. The microminiaturized projection module according to claim 1, wherein the mirror is a 2-axis torsion mirror.

5. The microminiaturized projection module according to claim 4, wherein the mirror, having a horizontal-axle and a vertical-axle, can rotate horizontally relative to the vertical-axle and vertically relative to the horizontal-axle, and has mechanical rotation angles up to ±10°, respectively.

6. The microminiaturized projection module according to claim 1, wherein the mirror comprises two single-axle torsion mirrors.

7. The microminiaturized projection module according to claim 6, wherein one of the two single-axle torsion mirrors scans faster than the other.

8. The microminiaturized projection module according to claim 6, wherein the two single-axle torsion mirrors each has an axle perpendicular to each other.

9. The microminiaturized projection module according to claim 1, wherein the mirror is driven by electromagnetic forces, electrostatic forces, piezoelectric forces or the combination thereof.

10. The microminiaturized projection module according to claim 1, wherein the mirror is made of semiconductor, metal or polymer.

11. The microminiaturized projection module according to claim 1, wherein the mirror is made by micro-electro-mechanical system (MEMS) technology.

12. The microminiaturized projection module according to claim 1, wherein the image is scanned via raster scanning or Lissajous scanning.

13. The microminiaturized projection module according to claim 1, wherein the light units comprise visible laser diodes.

14. The microminiaturized projection module according to claim 1, wherein the light unit emits green light by diode pumped solid-state (DPSS) technology.

15. The microminiaturized projection module according to claim 1, wherein the modulation units comprise acoustic-optic modulators, magneto-optic modulators, or electro-optic modulators for independently modulating the red, green and blue beams generated by the light units.

16. The microminiaturized projection module according to claim 1, wherein the mirror rotates horizontally and vertically according to the direction signal to project the modulated beams onto the object.

17. The microminiaturized projection module according to claim 1, wherein the object is a wall, a screen, a table surface or a billboard.

18. The microminiaturized projection module according to claim 1, wherein the object has planar, curved or rough surface.

19. The microminiaturized projection module according to claim 1, wherein the object is divided into n columns and m rows and each of the mirrors scans on a specified region formed by intersection of a column and a row.

20. The microminiaturized projection module according to claim 19, wherein the columns have the same width.

21. The microminiaturized projection module according to claim 19, wherein the rows have the same length.

* * * * *